US009613560B2

(12) United States Patent
Chen

(10) Patent No.: US 9,613,560 B2
(45) Date of Patent: Apr. 4, 2017

(54) BACKLIGHT DRIVING METHOD, BACKLIGHT DRIVING DEVICE, AND DISPLAY DEVICE

(71) Applicant: BOE Technology Group Co., Ltd., Beijing (CN)

(72) Inventor: Shuo Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 203 days.

(21) Appl. No.: 14/095,012

(22) Filed: Dec. 3, 2013

(65) Prior Publication Data

US 2014/0152710 A1 Jun. 5, 2014

(30) Foreign Application Priority Data

Dec. 5, 2012 (CN) .......................... 2012 1 0518350

(51) Int. Cl.
*G09G 5/10* (2006.01)
*G09G 3/22* (2006.01)
(Continued)

(52) U.S. Cl.
CPC .............. *G09G 3/22* (2013.01); *G09G 3/003* (2013.01); *G09G 3/342* (2013.01); *G09G 3/3426* (2013.01);
(Continued)

(58) Field of Classification Search
CPC ..... G09G 2310/024; G09G 2320/0209; G09G 2320/0233; G09G 3/003; G09G 3/22; G09G 3/342; G09G 3/3426
(Continued)

(56) References Cited

U.S. PATENT DOCUMENTS

2005/0146532 A1* 7/2005 Miyazaki ............. G09G 3/2096
345/600
2011/0157260 A1* 6/2011 Pyun et al. ................... 345/691
(Continued)

FOREIGN PATENT DOCUMENTS

CN 102469327 A 5/2012

OTHER PUBLICATIONS

Extended search report from European Patent Office for corresponding European application 13194563.6 dated Feb. 26, 2014.
(Continued)

*Primary Examiner* — Kwin Xie
(74) *Attorney, Agent, or Firm* — Frommer Lawrence & Haug LLP

(57) ABSTRACT

The invention discloses a backlight driving method, a backlight driving device, and a display device. The method comprises steps of: acquiring turn-on timings of respective areas of a backlight source of a display device and an opening timing of a 3D glasses; adjusting driving signals for the respective areas of the backlight source based on each length of overlapping time between the opening timing of the 3D glasses and each of the turn-on timings of the respective areas of the backlight source, thus making brightness of light from pictures corresponding to the respective areas of the backlight source in the display device be the same, said light being received through the 3D glasses; and driving the corresponding areas in the backlight source to be turned on by using the adjusted driving signals for the respective areas of the backlight source.

11 Claims, 4 Drawing Sheets

(51) Int. Cl.
*G09G 3/00* (2006.01)
*G09G 3/34* (2006.01)
*H04N 13/04* (2006.01)

(52) U.S. Cl.
CPC ..... *H04N 13/0438* (2013.01); *H04N 13/0497* (2013.01); *G09G 2310/024* (2013.01); *G09G 2320/0209* (2013.01); *G09G 2320/0233* (2013.01)

(58) Field of Classification Search
USPC .................................................. 345/690–691
See application file for complete search history.

(56) References Cited

U.S. PATENT DOCUMENTS

| | | | |
|---|---|---|---|
| 2011/0221747 A1* | 9/2011 | Kim ................... | H04N 13/0438 345/419 |
| 2011/0285761 A1 | 11/2011 | Yu | |
| 2011/0292089 A1 | 12/2011 | Nakahata et al. | |
| 2013/0141435 A1* | 6/2013 | Cho et al. ..................... | 345/426 |

OTHER PUBLICATIONS

Office action issued by Chinese Patent Office for priority application CN 201210518350.8 dated Jan. 24, 2014.

Office action issued by Korean Patent Office for corresponding Korean application 10-2013-0150174 dated Sep. 29, 2014 with English translation.

\* cited by examiner

BACKLIGHT DRIVING METHOD, BACKLIGHT DRIVING DEVICE, AND DISPLAY DEVICE

TECHNICAL FIELD

The embodiments of the present invention relates to field of display technology, in particular, to a backlight driving method, a backlight driving device, and a display device.

BACKGROUND ART

The scanning backlight technique refers to such a technique that in a frame of picture, respective areas of a backlight are turned on in order according to responding timings of liquid crystals, thus enhancing the quality of picture. This technique helps to improve the dynamic quality of picture and contrast of liquid-crystal televisions, and the quality of picture of active-shutter 3D televisions.

In an active-shutter 3D television, a liquid-crystal screen is refreshed alternately with image data of the left and right eye's field of view. When displaying images for the right eye on the screen, the right lens of glasses is opened and the left one closed, and when displaying images for the left eye on the screen, the right lens of glasses is closed and the left one opened. With this cyclic operation, 3D pictures are created through alternating fields of view.

As illustrated in FIGS. 1 and 2, four areas shown as A, B, C and D are areas which respond to liquid-crystal screen image signals. When area A finishes responding, LEDs of area A are turned on, and then followed in turn by areas B, C and D. Within the time of one single frame, the four areas A, B, C and D turn on and off the respective LEDs once, and since the time during which the 3D glasses is opened within that frame concentrates primarily on the period of time during which the LEDs of the two areas B and C are turned on, more light is received from areas B and C through the 3D glasses. On the other hand, the 3D glasses is opened only for a small fraction of time while the two areas A and D are turned on, therefore less light is received through the 3D glasses, thus making the two areas A and D appear darker than the two areas B and C for people wearing the glasses. As shown in FIG. 2, four waveforms in the middle are timings corresponding to the four areas A, B, C and D, respectively, and the waveform at the bottom of FIG. 2 is a timing diagram of the 3D glasses. In 3D mode, since an opening time of the 3D glasses is limited, an integral value of brightness over the time while the 3D glasses is opened represents the brightness of the respective area, i.e., the area of the shadowed portion in FIG. 2 represents the brightness under the 3D glasses, and apparently, areas A and D are darker than areas B and C. That is to say, a situation could occur that the brightness of picture is uneven when the same frame of picture is being viewed, and the picture goes darker towards the two edges, thus offering poor viewing effects.

SUMMARY OF INVENTION

The technical problem to be solved by the embodiments of the present invention is how to enable users to see pictures of even brightness while viewing the pictures of screen through 3D glasses.

To solve the above-mentioned technical problem, the embodiments of the present invention provides a backlight driving method comprising steps of acquiring turn-on timings of respective areas of a backlight source of a display device and an opening timing of a 3D glasses; adjusting driving signals for the respective areas of the backlight source based on each length of overlapping time between the opening timing of the 3D glasses and each of the turn-on timings of the respective areas of the backlight source, thus making the brightness of received light from pictures corresponding to the respective areas of the backlight source in the display device be the same, said light being received through the 3D glasses; and driving the corresponding areas in the backlight source to be turned on by using the adjusted driving signals for the respective areas of the backlight source.

In the backlight driving method, the step of adjusting the driving signals for the respective areas of the backlight source may further comprise: calculating the overlapping time $\Delta T_1, \Delta T_2, \ldots \Delta T_n$ between the opening timing of the 3D glasses and each of the turn-on timings of the respective areas of the backlight source, wherein n indicating the number of areas of the backlight source; and calculating and adjusting amplitudes of the driving signals $I_1, I_2, \ldots I_n$ so that $$\int_0^{\Delta T_1} I_1 dt = \int_0^{\Delta T_2} I_2 dt = \ldots = \int_0^{\Delta T_n} I_n dt = L$$

wherein the brightness is represented by an integral value of the amplitude of the driving signal over the length of the overlapping time, and L is a preset brightness value.

In the backlight driving method, the step of adjusting the driving signals for the respective areas of the backlight source may further comprise; adjusting durations of the driving signals $I_1, I_2, \ldots, I_n$ respectively to $\Delta T_1, \Delta T_2, \ldots, \Delta T_n$.

In the backlight driving method, prior to the step of calculating the amplitudes of the driving signals, the method may further comprise acquiring a user-set brightness value as the preset brightness value L.

In the backlight driving method, prior to the step of calculating the amplitudes of the driving signals and the step of adjusting the durations of the driving signals, the method may further comprise acquiring a user-set brightness value as said preset brightness value L.

In the backlight driving method, the step of acquiring a user-set brightness value as the preset brightness value L may further comprise: detecting the brightness of the display device adjusted by a user, and taking the brightness value corresponding to the final adjusted brightness as the preset brightness value L.

The embodiments of the present invention also provides a backlight driving device comprising: a timing acquiring module, a driving adjusting module, and a driving module, with the timing acquiring module connected to the driving adjusting module, and the driving adjusting module connected to the driving module. The timing acquiring module acquires turn-on timings of respective areas of a backlight source of a display device and an opening timing of a 3D glasses, and transmits the acquired timings to the driving adjusting module. Based on each length of overlapping time between the opening timing of the 3D glasses and each of the turn-on timings of the respective areas of the backlight source, the driving adjusting module adjusts driving signals for the respective areas of the backlight source, thus making the brightness of received light from pictures corresponding to the respective areas of the backlight source in the display device be the same, said light being received through the 3D glasses. The driving module drives the corresponding areas in the backlight source to be turned on by using the adjusted driving signals for the respective areas of the backlight source.

In the backlight driving device, the driving adjusting module may comprise: a preset brightness storing module, an overlapping time calculating module, and a signal amplitude adjusting module, with the signal amplitude adjusting module connected respectively to the preset brightness storing module and the overlapping time calculating module. The preset brightness storing module is used for storing a preset brightness value L. The overlapping time calculating module calculates the overlapping time $\Delta T_1, \Delta T_2, \ldots \Delta T_n$ between the opening timing of the 3D glasses and each of the turn-on timings of the responsive areas of the backlight source, wherein n indicating the number of areas of the backlight source. The signal amplitude adjusting module calculates and adjusts amplitudes of the driving signals $I_1, I_2, \ldots I_n$, so that $\int_0^{\Delta T_1} I_1 dt = \int_0^{\Delta T_2} I_2 dt = \ldots = \int_0^{\Delta T_n} I_n dt = L$, wherein the brightness is represented by an integral value of the amplitude of the driving signal over the length of the overlapping time.

In the backlight driving device, the driving adjusting module may further comprise: a signal duration adjusting module connected to the overlapping time calculating module, which adjusts durations of the driving signals $I_1, I_2, \ldots, I_n$ respectively to $\Delta T_1, \Delta T_2, \ldots, \Delta T_n$.

the backlight driving device my further comprise: a brightness acquiring module which is connected to the preset brightness storing module, the brightness acquiring module acquires a user-set brightness value and transmits this set brightness value to the preset brightness storing module for storing.

In the backlight driving device, the brightness acquiring module is: a brightness detecting module which is connected to the preset brightness storing module. The brightness detecting module detects the brightness of the display device adjusted by a user, and takes the brightness value corresponding to the final adjusted brightness as the preset brightness value L to transmit it to the preset brightness storing module for storing.

The invention also provides a display device comprising the backlight driving device described in any of the instances above.

Based on the each length of overlapping time between the opening timing of the 3D glasses and each of the turn-on timings of the respective areas of the backlight source, the backlight driving method and device according to the embodiments of the present invention adjust the magnitudes of driving signals for the respective areas of the backlight source, to achieve the objective of making the brightness of light, which is received through the 3D glasses and from the pictures corresponding to the respective areas of the backlight source in the display device, be the same, this enabling users to see pictures of even brightness while viewing the pictures of screen through 3D glasses.

DESCRIPTION OF EMBODIMENTS

The specific implementations of the present invention will now be described in further detail in conjunction with the drawings and embodiments. The embodiments below are for the sake of explaining the embodiments of the present invention, but not for limiting the scope of the present invention.

Based on scanning backlight technique and by calculating and adjusting, the embodiments of the present invention changes amplitudes of backlight driving signals or changes both their amplitudes and timings (durations), making the backlight has different brightness distributions in different areas to match the opening timing of the 3D glasses, this achieving better 3D user experience.

Figure 3:
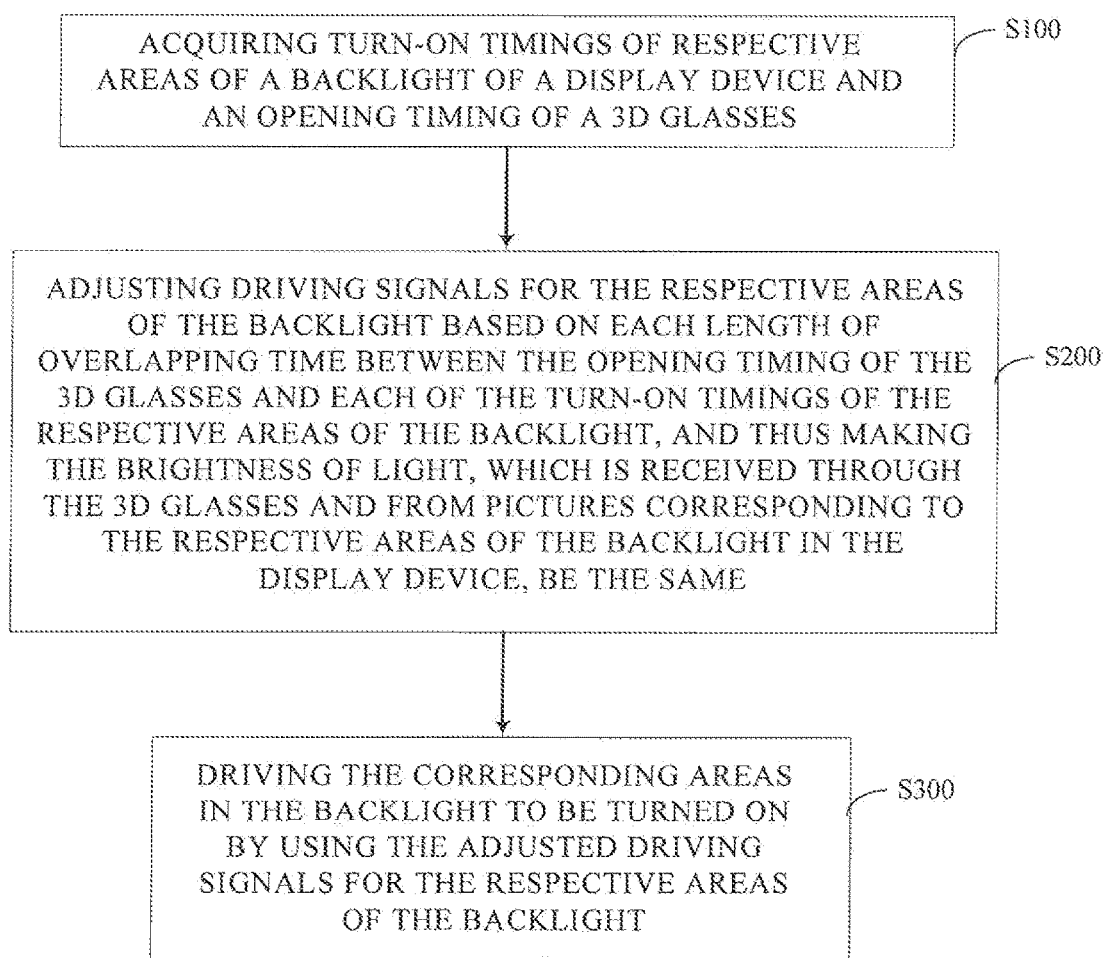
FIG. 3 is a flowchart of a backlight driving method according to embodiments of the present invention.

As shown in FIG. 3, a flowchart of a backlight driving method according to the present embodiment comprises steps S100, S200 and S300. The respective steps will be described below.

In step S100, turn-on timings of respective areas of a backlight source of a display device and an opening timing of a 3D glasses are acquired. In active-shutter 3D display mode, the display device achieves 3D display according to the predetermined cooperation between the turn-on timings of the respective areas of the backlight source and the opening timing of the 3D glasses. The display device usually has a timing controller which would provide a timing driving signal to a backlight source driving IC (i.e., driving module which drives the backlight source); a synchronization signal for the 3D glasses is provided by a main board. Usually when watching a 3D television, the synchronization signal for the 3D glasses needs to be adjusted to synchronize with driving signals for backlight, in order to achieve 3D viewing effects. Therefore in this step, the turn-on timings of the respective areas of the backlight source and the opening timing of the 3D glasses can be acquired respectively from the timing controller and the main board.

In step S200, the driving signals for the respective areas of the backlight source are adjusted based on each length of overlapping time between the opening timing of the 3D glasses and each of the turn-on timings of the respective areas of the backlight source, thus making the brightness of light, which is received through the 3D glasses and from pictures corresponding to the respective areas of the backlight source in the display device, be the same.

The step of adjusting the driving signals for the respective areas of the backlight source (S200) may comprise the steps of:

S201: calculating the overlapping time $\Delta T_1, \Delta T_2, \ldots, \Delta T_n$ between each of the turn-on timings of the respective areas of the backlight source and the opening timing of the 3D glasses, wherein n indicating that the backlight source has n areas (usually n≥2, i.e., there are at least two areas). Since the two types of timings mentioned above are already known, the overlapping time between the two types of timings can be readily obtained. Since the timings are predetermined, $\Delta T_1, \Delta T_2, \ldots, \Delta T_n$ might not be the same.

S202: calculating and adjusting amplitudes of the driving signals $I_1, I_2, \ldots I_n$, so that $$\int_0^{\Delta T_1} I_1 dt = \int_0^{\Delta T_2} I_2 dt = \ldots = \int_0^{\Delta T_n} I_n dt = L$$

wherein the brightness is represented by an integral value of the amplitude of driving signal over the length of said overlapping time, and L is set as a preset brightness value.

Figure 1:
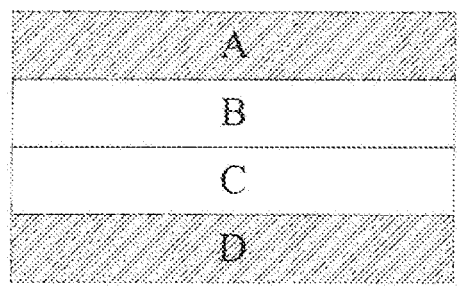
FIG. 1 is a schematic diagram showing that the picture seen through an active-shutter 3D glasses is darker at the two edges in prior art.
Figure 2:
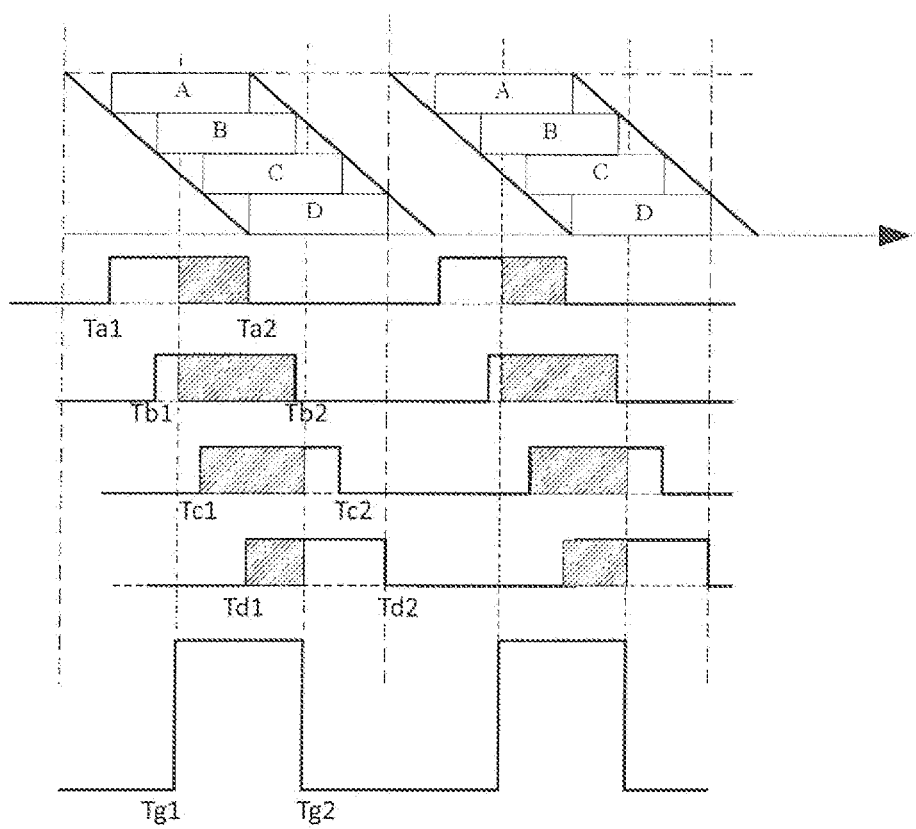
FIG. 2 is a timing diagram causing that the picture in FIG. 1 is darker at the two edges.

As shown in FIG. 2 and for ease of understanding, in the backlight driving method of the present embodiment, the backlight source and the panel are partitioned into four areas A, B, C and D as an example for illustration, and the backlight source usually is a LED which employs current driving (the waveform being square wave).

Figure 4:
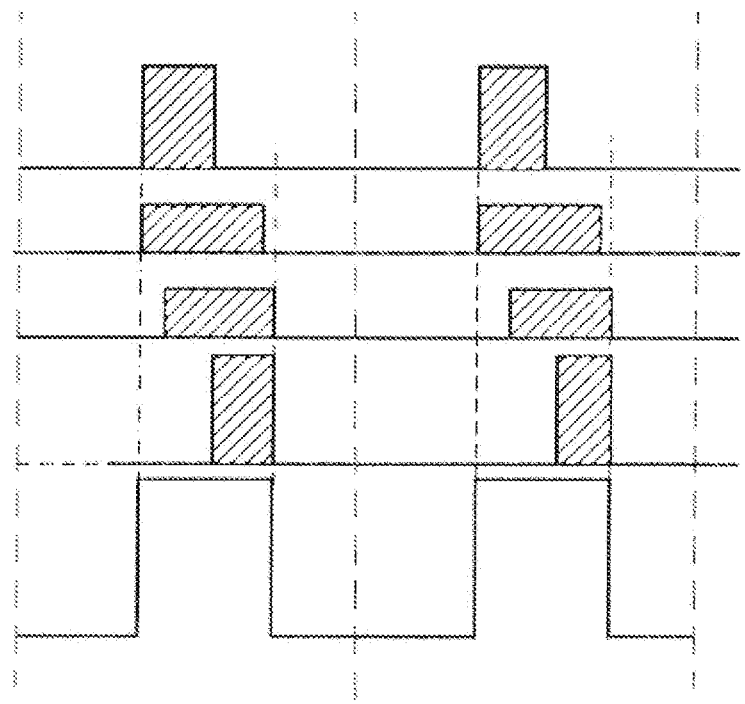
FIG. 4 is a timing diagram showing the relation between driving signals of the method in FIG. 3 and an opening timing of a 3D glasses.

The brightness $L_A$ of area A: $L_A = I_A \times \Delta T_A = I_A \times (T_{a2} - T_{g1})$ The brightness $L_B$ of area B: $L_B = I_B \times \Delta T_B = I_B \times (T_{b2} - T_{g1})$ The brightness $L_C$ of area C: $L_C = I_C \times \Delta T_C = I_C \times (T_{g2} - T_{c1})$ The brightness $L_D$ of area D: $L_D = I_D \times \Delta T_D = I_D \times (T_{g2} - T_{d1})$ $\Delta T_A$, $\Delta T_B$, $\Delta T_C$ and $\Delta T_D$ are different due to timing differences, and $I_A$, $I_B$, $I_C$ and $I_D$ are adjusted to make $L_A$, $L_B$, $L_C$ and $L_D$ become the same, i.e., equal to a preset brightness value L. As shown in FIG. 4, since $\Delta T_A$ and $\Delta T_D$ corresponding to areas A and D are shorter, the amplitudes of adjusted driving currents $I_A$ and $I_D$ corresponding to areas A and D of the backlight source are greater (greater than the amplitudes of $I_B$ and $I_C$, as can be seen from FIG. 4), thus ensuring that the brightness of light received through the 3D glasses is the same for the pictures corresponding to the respective areas of the backlight source in the display device.

As the amplitudes of driving signals increase, energy consumption becomes greater. For certain areas such as A and D, the overlapping time between the turn-on timing of that area and the opening timing of the 3D glasses is not very long, and if driving is performed according to the original timing, i.e., if the duration of backlight driving signal stays the same with the original duration, for example, the duration corresponding to area A is $T_{a2} - T_{a1}$, then after the amplitude of driving signal is increased, energy consumption within the time period $T_{g1} - T_{a1}$ will also increase.

Therefore, further in the step of adjusting the driving signal for each area of the backlight source (S200), in particular when adjusting the amplitudes of driving signals $I_1, I_2, \ldots, I_n$ according to the equation above (S202), it may also comprise the step of adjusting the durations of individual driving signals $I_1, I_2, \ldots, I_n$ respectively to the overlapping time $\Delta T_1, \Delta T_2, \ldots, \Delta T_n$ between each of the turn-on timings of the respective areas of the backlight source and the opening timing of the 3D glasses, so as to reduce unnecessary energy consumption (S203). FIG. 4 illustrates a timing diagram showing the relation between the driving signals and the opening timing of the 3D glasses after the driving signals are adjusted. Referring to FIG. 2 and FIG. 4, the duration of driving signal $I_1$ for area A is adjusted to $T_{a2} - T_{g1}$ (i.e., $\Delta T_1$), and since there is no driving signal flowing during the time period $T_{g1} - T_{a1}$, energy consumption is reduced accordingly. It is to be noted that if step S203 has to be performed, step S202 and step S203 can be performed substantially simultaneously, or performed in sequence, one after another.

The above-mentioned adjusting procedure can be carried out through a microcontroller on a backlight source driving chip controlling each of the driving signals, including controlling the amplitudes and on/off time (durations) of the driving signals.

In step S300, the adjusted driving signals for the respective areas of the backlight source are utilized to drive the corresponding areas in the backlight source to be turned on.

By the steps above, users could see pictures of even brightness while viewing the pictures of screen through 3D glasses, thus getting improved user experience.

Wherein, the preset brightness value L may be fixed in the driving chip of the display device, or may be obtained in real time as the user adjusting the brightness of the display device and then stored in corresponding memory.

Figure 5:
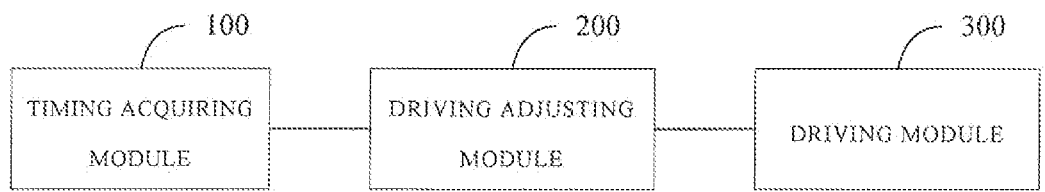
FIG. 5 is a block diagram of a backlight driving device according to embodiments of the present invention.

Furthermore, prior to calculating the amplitudes of driving signals (S202), or prior to calculating the amplitudes of driving signals (S202) and adjusting the durations of driving signals (S203), it may also comprise a step of: acquiring a user-set brightness value as the preset brightness value L. This brightness value may be a user-set value indicating brightness which is directly received, or may be a value obtained through detecting the brightness of the display device adjusted by the user, and the brightness value corresponding to the final adjusted brightness is taken as the preset brightness value L. Through setting the preset brightness value L, users can conveniently set the desired brightness of their own, The embodiments of the present invention also provides a backlight driving device implementing the backlight driving method described above, as shown in FIG. 5, the device comprises: a timing acquiring module 100, a driving adjusting module 200, and a driving module 300. The timing acquiring module 100 is connected to the driving adjusting module 200, and the driving adjusting module 200 is connected to the driving module 300.

The timing acquiring module 100 acquires turn-on timings of respective areas of a backlight source of a display device and an opening timing of a 3D glasses, and transmits the acquired timings to the driving adjusting module 200. The display device usually has a timing controller which would provide a timing driving, signal to the backlight source driving IC (i.e., the driving module 300 which drives the backlight source); a synchronization signal for the 3D glasses is provided by a main board. Usually when watching a 3D television, the synchronization signal for the 3D glasses needs to be adjusted to synchronize with driving signals for backlight, in order to achieve 3D viewing effects. The timing acquiring module 100 acquires the turn-on timings of the respective areas of the backlight source and the opening timing of the 3D glasses from the timing controller and the main hoard respectively.

Based on each length of overlapping time between each of the turn-on timings of the respective areas of the backlight source and the opening timing of the 3D glasses, the driving adjusting module 200 adjusts driving signals for the respective areas of the backlight source, thus making the brightness of light of the pictures corresponding to the respective areas of the backlight source in the display device be the same, the light being received through the 3D glasses.

Figure 6:
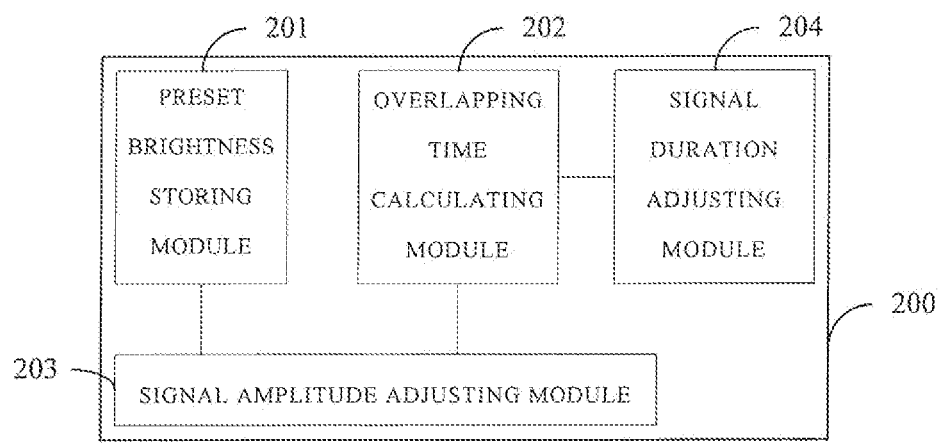
FIG. 6 is a block diagram of the driving adjusting module in FIG. 5.

The block diagram of the driving adjusting module 200 is as shown in FIG. 6, which comprises: a preset brightness storing, module 201, an overlapping time calculating module 202, and a signal amplitude adjusting module 203, with the signal amplitude adjusting module 203 connected respectively to the preset brightness storing module 201 and the overlapping time calculating module 202.

The preset brightness storing module 201 is used for storing a preset brightness value L.

The overlapping time calculating module 202 calculates the overlapping time $\Delta T_1, \Delta T_2, \ldots, \Delta T_n$ between each of the turn-on timings of the respective areas of the backlight source and the opening timing of the 3D glasses, wherein a indicating that the backlight source has n areas.

The signal amplitude adjusting module 203 acquires the preset brightness value L and the overlapping time $\Delta T_1$, $\Delta T_2$, ... $\Delta T_n$ from the preset brightness storing module 201 and the overlapping time calculating module 202 respectively. The signal amplitude adjusting module 203 calculates and adjusts amplitudes of the driving signals $I_1, I_2, \ldots I_n$, so that $$\int_0^{\Delta T_1} I_1 dt = \int_0^{\Delta T_2} I_2 dt = \ldots = \int_0^{\Delta T_n} I_n dt = L,$$

wherein the brightness is represented by an integral value of the amplitude of driving signal over the length of overlapping time.

The driving adjusting module 200 may further comprise: a signal duration adjusting module 204 connected to the overlapping time calculating module 202, which adjusts durations of individual driving signals $I_1, I_2, \ldots, I_n$ respectively to $\Delta T_1, \Delta T_2, \ldots, \Delta T_n$. The signal duration adjusting module 204 may adjust the durations of individual driving signals $I_1, I_2, \ldots, I_n$ respectively to $\Delta T_1, \Delta T_2, \ldots, \Delta T_n$ through controlling the on/off time of the driving signals.

The driving module 300 utilizes the adjusted driving signals for the respective areas of the backlight source to drive the corresponding areas in said backlight source to turn on.

The backlight driving device may further comprise: a brightness acquiring module (not shown) which is connected to the preset brightness storing module 201 in the driving adjusting module 200, the brightness acquiring module acquires a user-set brightness value, and transmits this set brightness value to the preset brightness storing module 201 for storing. Wherein, the brightness acquiring module may be a brightness detecting module which is connected to the preset brightness storing module 201; the brightness detecting module is used for detecting the brightness of the display device adjusted by a user (the brightness can be adjusted step-by-step through a remote control on the brightness adjusting interface of the display device), and takes the brightness value corresponding to the final adjusted brightness as the preset brightness value L to transmit it to the preset brightness storing module 201 for storing. Alternatively, the brightness acquiring module may also be a brightness input module which can receive user-input brightness values. For example, a user can input a brightness value L directly by performing a remote control on a brightness adjusting interface of the display device, and the brightness input module acquires the input brightness value L and transmits it to the preset brightness storing module 201.

With the backlight driving device according to the present embodiment, users could see pictures of even brightness while viewing the pictures through 3D glasses, thus getting improved user experience. The specific operational principles and effects of the respective modules in the backlight driving device have been set forth in the foregoing description, and therefore will not be repeated herein.

The respective components of the backlight driving device described above can be implemented in hardware, in firmware fixed and running on one or more processors, or in combinations thereof. It should be understood by a person skilled in the art that the device described above may be implemented using microprocessors or digital signal processors (DSP) in practice.

The embodiments of the present invention also provides a display device comprising the backlight driving device described above, the display device may be a liquid-crystal panel, electronic paper, a liquid-crystal television, a liquid-crystal display, a digital photo frame, a cell phone, a tablet computer, or any other product or element with displaying function.

The foregoing implementations are merely illustrative of the embodiments of the present invention rather than limiting the invention, and various changes and variations can be made by an ordinary person skilled in the relevant art without departing from the spirit and scope of the invention, therefore all the equivalent technical solutions also fall within the ambit of the invention, the patent protection scope of which should be defined only by the claims.

What is claimed is:

1. A backlight driving method, comprising steps of:
acquiring preset turn-on time periods of respective areas of a backlight source of a display device and an opening time period of a 3D glasses;
calculating each length of overlapping time periods $\Delta T1$, $\Delta T2, \ldots, \Delta Tn$ between the opening time period of the 3D glasses and each of the preset turn-on time periods of the respective areas of the backlight source, wherein n indicates the number of areas of the backlight source;
calculating and adjusting amplitudes of driving signals I1, I2, ..., In for the respective areas of the backlight source, so that $$\int_0^{\Delta T_1} I_1 dt = \int_0^{\Delta T_2} I_2 dt = \ldots = \int_0^{\Delta T_n} I_n dt = L,$$

wherein brightness is represented by an integral value of the amplitude of the driving signal over the length of the overlapping time period, and L is a preset brightness value; and
driving the corresponding areas in the backlight source to be turned on by using the adjusted driving signals for the respective areas of the backlight source,
wherein the backlight driving method further comprises, prior to the step of driving the corresponding areas in the backlight source, a step of adjusting durations of the driving signals I1, I2, ..., In during which the driving signals I1, I2, ..., In are turned on, such that the durations of the driving signals I1, I2, ..., In are controlled to be equivalent to the respective overlapping time periods $\Delta T1, \Delta T2, \ldots, \Delta Tn$, and that the driving signals I1, I2, ..., In are controlled to be turned off when the 3D glasses are not open, creating adjusted turn-on time periods; and
wherein the adjusted turn-on time periods of the respective areas of the backlight source, after the steps of adjusting the durations of the driving signals I1, I2, ..., In and driving the corresponding areas in the backlight source, are less than the preset turn-on time periods of the respective areas of the backlight source.

2. The backlight driving method as claimed in claim 1, wherein, prior to the step of calculating the amplitudes of the driving signals, the method further comprises acquiring a user-set brightness value as the preset brightness value L.

3. The backlight driving method as claimed in claim 1, wherein, prior to the step of calculating the amplitudes of the driving signals and the step of adjusting the durations of the driving signals, the method further comprises acquiring a user-set brightness value as said preset brightness value L.

4. The backlight driving method as claimed in claim 2, wherein the step of acquiring the user-set brightness value as the preset brightness value L further comprises: detecting the brightness of the display device adjusted by a user, and taking the brightness value corresponding to the final adjusted brightness as the preset brightness value L.

5. The backlight driving method as claimed in claim 3, wherein the step of acquiring the user-set brightness value as the preset brightness value L further comprises: detecting the brightness of the display device adjusted by a user, and taking the brightness value corresponding to the final adjusted brightness as the preset brightness value L.

6. A backlight driving device, comprising a timing acquiring module, a driving adjusting module, and a driving module, with the timing acquiring module connected to the driving adjusting module, and the driving adjusting module connected to the driving module, wherein the timing acquiring module acquires preset turn-on time periods of respective areas of a backlight source of a display device and an opening time period of a 3D glasses, and transmits the acquired time periods to the driving adjusting module;

the driving adjusting module comprises a preset brightness storing module, an overlapping time calculating module and a signal amplitude adjusting module, with the signal amplitude adjusting module connected respectively to the preset brightness storing module and the overlapping time calculating module, wherein the preset brightness storing module is used for storing a preset brightness value L, the overlapping time calculating module calculates each length of overlapping time periods $\Delta T1, \Delta T2, \ldots, \Delta Tn$ between the opening time period of the 3D glasses and each of the turn-on time periods of the respective areas of the backlight source, wherein n indicates the number of areas of the backlight source, and the signal amplitude adjusting module calculates and adjusts amplitudes of driving signals I1, I2, ..., In for the respective areas of the backlight source, so that $$\int_0^{\Delta T1} I_1 dt = \int_0^{\Delta T2} I_2 dt = \ldots = \int_0^{\Delta Tn} I_n dt = L,$$

wherein brightness is represented by an integral value of the amplitude of the driving signal over the length of the overlapping time period; and the driving module drives the corresponding areas in the backlight source to be turned on by using the adjusted driving signals for the respective areas of the backlight source, wherein the driving adjusting module further comprises a signal duration adjusting module connected to the overlapping time calculating module, the signal duration adjusting module adjusts durations of the driving signals I1, I2, ..., In during which the driving signals I1, I2, ..., In are turned on, such that the durations of the driving signals I1, I2, ..., In are controlled to be equivalent to the respective overlapping time periods $\Delta T1, \Delta T2, \ldots, \Delta Tn$, and that the driving signals I1, I2, ..., In are controlled to be turned off when the 3D lasses are not open, creating adjusted turn-on time periods; and wherein the adjusted turn-on time periods of the respective areas of the backlight source after adjusting the durations of the driving signals I1, I2, ... In and driving the corresponding areas in the backlight source are less than the preset turn-on time periods of the respective areas of the backlight source.

7. The backlight driving device as claimed in claim 6, wherein the backlight driving device further comprises: a brightness acquiring module which is connected to the preset brightness storing module, the brightness acquiring module acquires a user-set brightness value and transmits this set brightness value to the preset brightness storing module for storing.

8. The backlight driving device as claimed in claim 7, wherein the brightness acquiring module is a brightness detecting module which is connected to the preset brightness storing module;

the brightness detecting module detects the brightness of the display device adjusted by a user, and takes the brightness value corresponding to the final adjusted brightness as the preset brightness value L to transmit it to the preset brightness storing module for storing.

9. A display device, comprising a backlight driving device comprising a timing acquiring module, a driving adjusting module, and a driving module, wherein the timing acquiring module is connected to the driving adjusting module, and the driving adjusting module is connected to the driving module, and wherein the timing acquiring module acquires preset turn-on time periods of respective areas of a backlight source of a display device and an opening time period of a 3D glasses, and transmits the acquired time periods to the driving adjusting module;

the driving adjusting module comprises a preset brightness storing module, an overlapping time calculating module and a signal amplitude adjusting module, with the signal amplitude adjusting module connected respectively to the preset brightness storing module and the overlapping time calculating module, wherein the preset brightness storing module is used for storing a preset brightness value L, the overlapping time calculating module calculates each length of overlapping time periods $\Delta T1, \Delta T2, \ldots, \Delta Tn$ between the opening time period of the 3D glasses and each of the turn-on time periods of the respective areas of the backlight source, wherein n indicates the number of areas of the backlight source, and the signal amplitude adjusting module calculates and adjusts amplitudes of the driving signals I1, I2, ..., In for the respective areas of the backlight source, so that $$\int_0^{\Delta T1} I_1 dt = \int_0^{\Delta T2} I_2 dt = \ldots = \int_0^{\Delta Tn} I_n dt = L,$$

wherein brightness is represented by an integral value of the amplitude of the driving signal over the length of the overlapping time period; and the driving module drives the corresponding areas in the backlight source to be turned on by using the adjusted driving signals for the respective areas of the backlight source, wherein the driving adjusting module further comprises a signal duration adjusting module connected to the overlapping time calculating module, the signal duration adjusting module adjusts durations of the driving signals I1, I2, ..., In during which the driving signals I1, I2, ..., In are turned on, such that the durations of the driving signals I1, I2, ..., In are controlled to be equivalent to the respective overlapping time periods $\Delta T1, \Delta T2, \ldots, \Delta Tn$, and that the driving signals I1, I2, ..., In are controlled to be turned off when the 3D glasses are not open, creatin adjusted turn-on time periods; and wherein the adjusted turn-on time periods of the respective areas of the backlight source after adjusting the durations of the driving signals I1, I2, ..., In and driving the corresponding areas in the backlight source are less than the preset turn-on time periods of the respective areas of the backlight source.

10. The display device as claimed in claim 9, wherein the backlight driving device further comprises: a brightness acquiring module which is connected to the preset brightness storing module, the brightness acquiring module acquires a user-set brightness value and transmits this set brightness value to the preset brightness storing module for storing.

11. The display device as claimed in claim 10, wherein the brightness acquiring module is a brightness detecting module which is connected to the preset brightness storing module;

the brightness detecting module detects the brightness of the display device adjusted by a user, and takes the brightness value corresponding to the final adjusted brightness as the preset brightness value L to transmit it to the preset brightness storing module for storing.

* * * * *